United States Patent [19]

Zoller

[11] 4,090,906
[45] May 23, 1978

[54] METHOD OF MAKING A TRIM STRIP

[75] Inventor: Robert A. Zoller, Bay Village, Ohio

[73] Assignee: The Standard Products Company, Dearborn, Mich.

[21] Appl. No.: 794,922

[22] Filed: May 9, 1977

Related U.S. Application Data

[63] Continuation of Ser. No. 690,027, May 26, 1976, abandoned.

[51] Int. Cl.² .............................................. B29F 3/00
[52] U.S. Cl. ............................ 156/244.27; 156/250; 156/268; 156/269; 296/41; 296/93
[58] Field of Search ............... 156/153, 154, 244, 250, 156/211, 257, 267, 268, 269, 271; 264/145, 151, 161, 162, 176 R, 177 R, 280; 296/41, 93; 428/157, 158, 159, 167

[56] References Cited

U.S. PATENT DOCUMENTS

| | | | |
|---|---|---|---|
| 2,625,715 | 1/1953 | Beck | 296/93 |
| 2,654,919 | 10/1953 | Marvin | 296/93 |
| 2,770,487 | 11/1956 | Isbell | 296/93 |
| 3,013,919 | 12/1961 | Bigly | 156/244 |
| 3,290,195 | 12/1966 | Davis | 156/244 |
| 3,440,129 | 4/1969 | Anselm | 156/244 |
| 3,467,742 | 9/1969 | Shokert | 264/162 |
| 3,811,989 | 5/1974 | Hearn | 156/244 |
| 3,843,475 | 10/1974 | Kent | 156/244 |

Primary Examiner—Caleb Weston
Attorney, Agent, or Firm—Harness, Dickey, Pierce

[57] ABSTRACT

The disclosure relates to a method of making a trim strip comprising the extrusion of a vinyl material to form a body which is so shaped that it can be confined in a peripheral slot in a roll, thereby to permit substantial pressure to be applied on the extruded body and a decorative strip by a mating roll. The top portion of the extruded body has side extensions which are supported by the edges of the recessed roll; thus, substantial pressure can be applied on the entire top of the decorative surface strip and the body to produce an adhesive bond or a bond by heat sealing. After the body is cooled, it is advanced through a number of aligned milling cutters to machine aligned recesses in the sides of the body to produce a retention cutout. After being machined to depth, the trim strip is advanced through a pair of grinding wheels to accurately form and space the recesses. During the extruding operation, a coated wire may be embedded within the body in the conventional manner.

3 Claims, 4 Drawing Figures

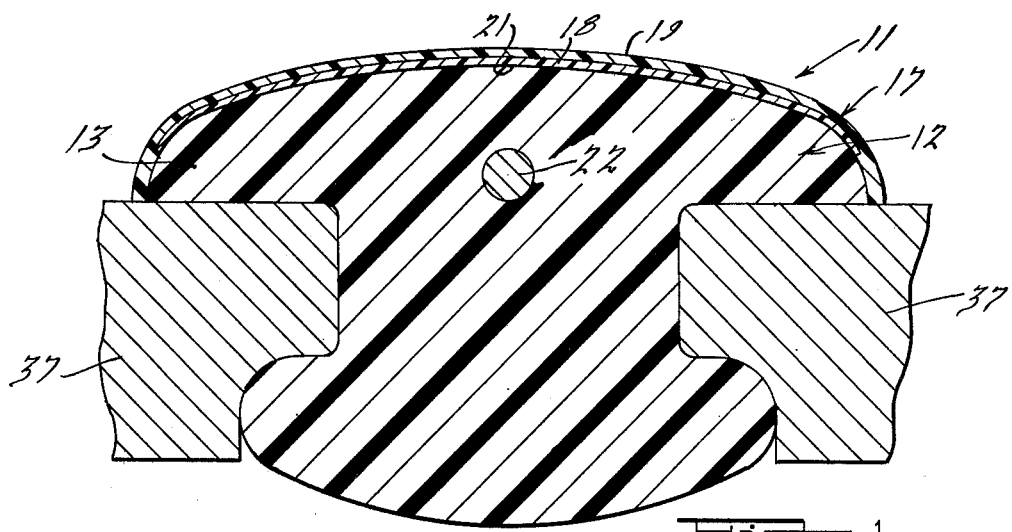
Fig. 1.
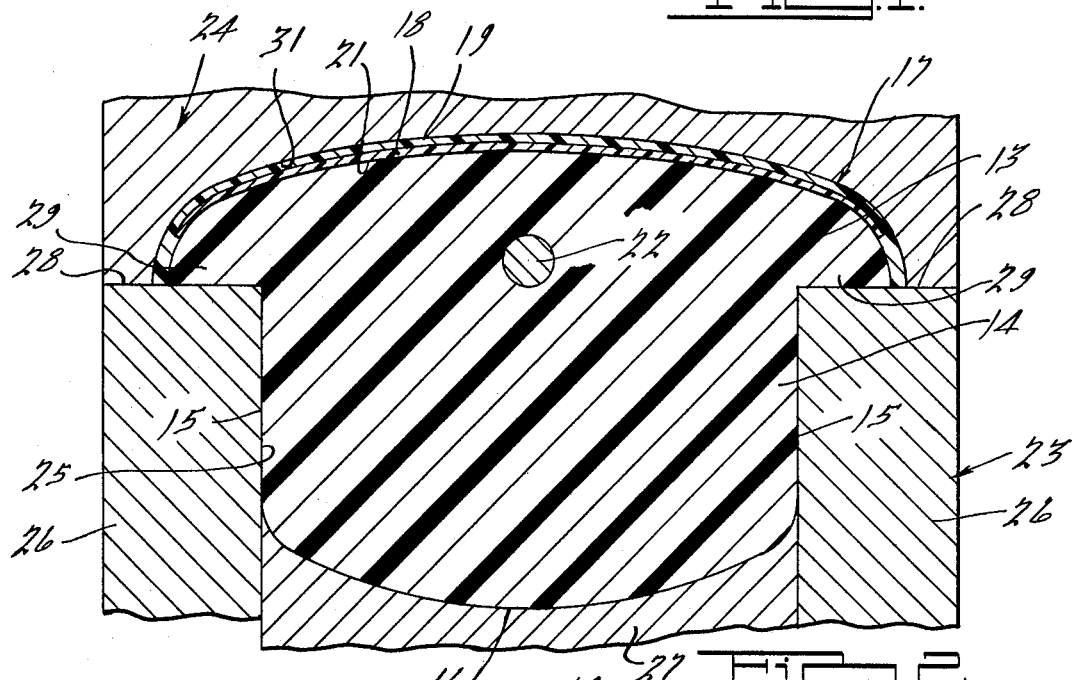
Fig. 2.
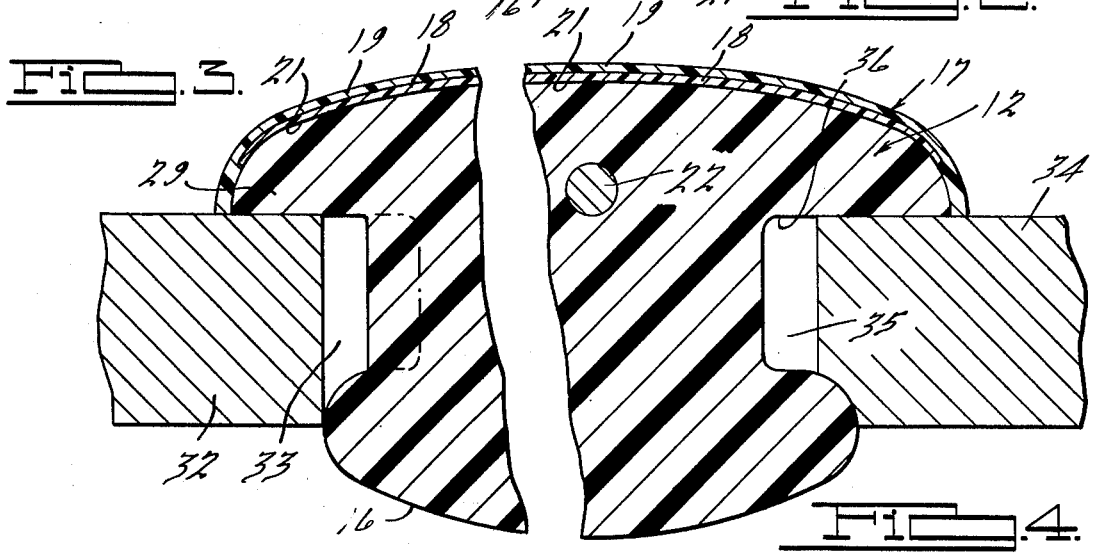
Fig. 3.
Fig. 4.

METHOD OF MAKING A TRIM STRIP

This is a continuation of application Ser. No. 690,027, filed May 26, 1976, abandoned.

BACKGROUND OF THE INVENTION

Difficulty has been experienced in producing a decorative trim strip with undercut recesses in the sides of the extruded body thereof due to the limited amount of pressure which can be applied to such a decorative strip incident to bonding of the top surface thereof to the extruded body. One manner of producing such a decorative trim strip was to provide two extruded strips which are joined together after the decorative strip is applied by a substantial pressure to the surface of the top extruded strip. Thereafter, it was necessary to bond the two extruded strips together, all of which resulted in an increase in time and cost.

SUMMARY OF THE INVENTION

The invention pertains to the method of producing a decorative trim strip having aligned recesses in the sides of the body portion thereof by which it is secured in position. The difficulty in producing the strip is caused by the substantial pressure required to secure a decorative surface on the body portion thereof. In the present arrangement, the decorative strip has a body which is provided with sides which may be parallel or slightly convergent below a top portion which is to be decorated. The body has side extensions extending laterally beyond the straight sides of the body. The extruded body portion of the decorative trim strip is advanced between a pair of rolls, one roll having a recess which accurately receives the body portion of the extruded strip with side portions of the roll engaging the underside of the lateral extensions on the extruded element. The top of the body portions of the trip strip has, in the disclosed exemplarly embodiment, an arcuate surface. A second roll has a recess the shape of the top portion of the extruded body.

The body and a decorative top surface are advanced through the rolls which, along with the heat of the extruded material, produces a bonding of the decorative surface to the top surface of the body portion of the extrusion. Substantial pressure can be applied since all portions of the extruded material and decorative surface are confined and supported. Since undercut recesses are to be provided in the body below the top portion, the decorative extruded strip, when cooled, is advanced through sets of aligned milling cutters which cut the straight sides of the body to a predetermined depth until a desired depth for the recesses is reached. The decorative extruded strip may be further advanced through a set of aligned grinding wheels to accurately grind the recesses to exact size and shape.

BRIEF DESCRIPTION OF THE DRAWING

FIG. 1 is an enlarged sectional view of a finished decorative trim strip which is produced by the method of the present invention, including the use of aligned grinding wheels for finishing machined recesses to size;

FIG. 2 is a view of a pair of rolls which confine the extruded element when substantial pressure is employed to secure a decorative surface to the top surface of the extruded element;

FIG. 3 is a broken view of the extruded body and adherred decorative surface when cooled and advanced through a pair of aligned milling cutters for partially machining side recesses therein; and FIG. 4 is a broken view of the extruded body and adherred decorative surface similar to that illustrated in FIG. 3 being advanced between a second pair of aligned milling cutters which machine the side recesses to depth.

DESCRIPTION OF THE PREFERRED EMBODIMENT

A decorative trim strip 11, as illustrated in FIG. 1, comprises an extruded body portion 12 and a decorative top surface 17 which is adhesively bonded or heat sealed under pressure to the extruded body 12. The body 12 is extruded in the conventional manner from any formable heated material which is known to be suitable, for one herein employed being a plasticized black vinyl composition. As illustrated in FIG. 2, the body portion 12 has a lower portion 14 with straight sides 15 which may be parallel or slightly convergent and a bottom 16 of flat, arcuate or other shape, as desired. The body portion 12 has laterally extending edges 13 for support of the edges of the decorative surface 17.

In the disclosed embodiment, the decorative surface 17 has an inner transparent layer 18 and an outer transparent layer 19. The inner transparent layer 18 is a thin film of polyethylene terephthalate, commonly known as Mylar, which is provided with a metallic coating 21 applied by vapor deposition of a metal, such as aluminum, on the undersurace of the clear Mylar film which permits the metal coating to be visible therethrough. The Mylr film has its outer surface secured to the undersurface of the vinyl strip 19 by an adhesive bond or by a heat sealing. The outer layer 19 is clear to permit the metal to be visible therethrough. The outer layer 19 has, for example, a hardness of between 95 to 99 Durometer as measured on the Shore A scale, 15 second delay at ambient temperature. Obviously, other decorative surfaces can be employed within the concept of the invention.

If desired, during the extruding operation, a wire 22 having a suitable coating thereon, can be imbedded within the vinyl body 12 in the conventional manner. The trim strip 11 as herein illustrated is substantially enlarged. In reality, the width at the top edges 13 of the strip is approximately ½ inch, while the depth and width of the body portion 12 is approximately ⅛ of an inch.

A pair of rolls 23 and 24 support the extruded lower body portion 14 and the decorative surface 17 as they pass therethrough to secure the two portions together. The lower portion 14 is supported within the recess 25 of the roll 23 with the straight sides 15 in engagement with the inner surface of the side elements 26 and the bottom arcuate shape 16 with arcuate surface of the inner portion 27 of the roll recess 25. The top edge 28 of the side elements 26 engages the underside of the side extensions 29 of the top portion 13 which has an outer surface of arcuate shape.

The outer roll 24 has an arcuate recess 31 which conforms to the shape of the decorative strip 11. The extruded body portion 12 and decorative surface 17 are thus confined in the recesses 25 and 31 of the rolls 23 and 24 which are so formed as to apply substantial pressure to the surface 17 and body 12 when advanced between the rolls.

This substantial pressure produces the adhesive bond or heat sealing of the decorative and protective surface 17 to the body portion 12. The two portions of the trim strip 11 are bonded together over the entire engaged surfaces and are sufficiently flexible to permit the resulting decorative strip 11 to be bent at a comparatively small angle.

The trim strp 11, so produced, is permitted to cool and thereafter is advanced through cutting and grinding wheels to produce recesses 36 in the sides 15 thereof.

As illustrated in FIGS. 3 and 4, the decorative strip 11 is advanced through a plurality of milling cutters, two pairs being employed. The first pair 32 are aligned, the teeth 33 thereof cutting into the sides 15 of the lower portion 14 of the extruded body 12 after which the strip 11 is advanced to a second pair of aligned milling cutters 34 having teeth 35 thereon which cut the recesses 36 to proper depth. Further advancement of the decorative strip 11 moves it past a pair of aligned grindng wheels 37, as illustrated in FIG. 1, which shape the recesses 36 to exact form so that the trim strip can be readily secured in complimentary retaining clips. It is to be understood that if a shape other than the arcuate shape 16 is provided for the bottom of the lower portion 14 of the extruded body 12, the central portion 27 of the roll 23 will be provided with the same shape so as to prevent deflection of the material of the body 12 when pressure is applied by the roll 24 to the decorative surface 17 being bonded thereto.

While it will be apparent that the invention herein disclosed is well calculated to achieve the benefits and advantages as hereinabove set forth, it will be appreciated that the invention is susceptible to modification, variation and change without departing from the spirit thereof.

What is claimed is:

1. The method of producing a continuous decorative trim strip which includes the steps of: extruding a plastic material to produce a continuous flexible body with a lower portion having substantially parallel sides and a top portion having a laterally extending flange at each side edge extending above and laterally beyond the parallel sides, advancing said continuous flexible body and a decorative strip between bottom and top rollers which closely confine said body and decorative strip for securing the body and strip together under pressure, supporting all portions of said flexible body against movement in the direction of pressure application by said rollers, and advancing the strip from the rollers to have the parallel sides on the lower portion of said body pass between a pair of spaced milling cutters to produce inwardly extending recesses below the flanges and into the parallel sides of the lower body portion to facilitate retention of said flexible trim strip.

2. The method of producing a decorative trim strip as recited in claim 1, wherein the strip is further advanced to pass between a second pair of spaced milling cutters to deepen said recesses.

3. The method of producing a decorative trim strip as recited in claim 1, wherein the strip is further advanced to pass between a pair of spaced grinding wheels to finally form and smooth said recesses.

* * * * *